(12) United States Patent
Brookins et al.

(10) Patent No.: US 11,657,711 B2
(45) Date of Patent: May 23, 2023

(54) SYSTEMS AND METHODS FOR USING A DISTRIBUTED DATA CENTER TO CREATE MAP DATA

(71) Applicant: SmartDrive Systems, Inc., Westlake, TX (US)

(72) Inventors: Nicholas Shayne Brookins, Encinitas, CA (US); Reza Ghanbari, San Diego, CA (US); David Forney, La Jolla, CA (US); Mark Freitas, San Diego, CA (US); Daniel Andrew Deninger, Carlsbad, CA (US); Jeffrey Griswold, San Diego, CA (US); Jason Palmer, Carlsbad, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 371 days.

(21) Appl. No.: 17/080,164

(22) Filed: Oct. 26, 2020

(65) Prior Publication Data
US 2021/0074156 A1 Mar. 11, 2021

Related U.S. Application Data

(63) Continuation of application No. 16/049,389, filed on Jul. 30, 2018, now Pat. No. 10,818,175, which is a (Continued)

(51) Int. Cl.
*G08G 1/09* (2006.01)
*G08G 1/0967* (2006.01)
(Continued)

(52) U.S. Cl.
CPC ... *G08G 1/096791* (2013.01); *G01C 21/3492* (2013.01); *G01C 21/3822* (2020.08);
(Continued)

(58) Field of Classification Search
CPC .......... G08G 1/096791; G08G 1/0112; G08G 1/0133; G08G 1/0141; G08G 1/096716;
(Continued)

(56) References Cited

U.S. PATENT DOCUMENTS 6,735,630 B1 5/2004 Gelvin
6,812,888 B2 11/2004 Drury
(Continued)

FOREIGN PATENT DOCUMENTS

WO 2017079229 A1 5/2017

OTHER PUBLICATIONS

International Search Report and Written Opinion for PCTUS1927860, dated Jul. 10, 2019; 12 pages.
(Continued)

*Primary Examiner* — Michael V Kerrigan
(74) *Attorney, Agent, or Firm* — Esplin & Associates, PC

(57) ABSTRACT

This disclosure relates to a distributed data center that includes resources carried by a fleet of vehicles. The system includes sensors configured to generate output signals conveying information related to the vehicles and/or the surroundings of vehicles. The system includes a remote computing server configured to maintain map data and distribute it to the fleet, including local map data to individual vehicles pertaining to their surroundings. Individual vehicles may compare the local map data with the information related to their individual surroundings. Based on such comparisons, individual vehicles may detect discrepancies between the local map data and the information related to their individual surroundings. The remote computing server may modify and/or update the map data based on the detected discrepancies.

14 Claims, 5 Drawing Sheets

Related U.S. Application Data continuation of application No. 15/958,659, filed on Apr. 20, 2018, now Pat. No. 10,062,281.

(51) Int. Cl.
| | | |
|---|---|---|
| *G01C 21/34* | (2006.01) | |
| *G08G 1/0969* | (2006.01) | |
| *G08G 1/00* | (2006.01) | |
| *G08G 1/0968* | (2006.01) | |
| *G08G 1/01* | (2006.01) | |
| *G01C 21/00* | (2006.01) | |

(52) U.S. Cl.
CPC ......... *G08G 1/0112* (2013.01); *G08G 1/0133* (2013.01); *G08G 1/0141* (2013.01); *G08G 1/0969* (2013.01); *G08G 1/096716* (2013.01); *G08G 1/096741* (2013.01); *G08G 1/096775* (2013.01); *G08G 1/096844* (2013.01); *G08G 1/20* (2013.01); *G08G 1/205* (2013.01)

(58) Field of Classification Search
CPC ....... G08G 1/096741; G08G 1/096775; G08G 1/096844; G08G 1/0969; G08G 1/20; G08G 1/205; G01C 21/3492; G01C 21/3822; G01C 21/32
See application file for complete search history.

(56) References Cited

U.S. PATENT DOCUMENTS

| | | |
|---|---|---|
| 6,889,831 B2 | 5/2005 | Pike |
| 7,020,701 B1 | 3/2006 | Gelvin |
| 7,489,993 B2 | 2/2009 | Coffee |
| 7,715,961 B1 | 5/2010 | Kargupta |
| 10,102,691 B1 | 10/2018 | Ghanbari |
| 10,482,686 B2 | 11/2019 | Ghanbari |
| 10,607,425 B2 | 3/2020 | Kwak |
| 10,789,788 B1 | 9/2020 | Ghanbari |
| 10,818,175 B2 | 10/2020 | Brookins |
| 2005/0156715 A1 | 7/2005 | Zou |
| 2015/0269790 A1 | 9/2015 | Batcheller |
| 2016/0140872 A1 | 5/2016 | Palmer |
| 2016/0247109 A1 | 8/2016 | Scicluna |
| 2016/0300402 A1 | 10/2016 | Nassar |
| 2017/0023945 A1 | 1/2017 | Cavalcanti et al. |
| 2017/0292845 A1 | 10/2017 | Yamasaki |
| 2017/0330397 A1 | 11/2017 | Palmer |
| 2017/0351990 A1 | 12/2017 | Hecht |
| 2018/0005407 A1 | 1/2018 | Browning |
| 2018/0188044 A1* | 7/2018 | Wheeler ............... B60W 40/02 |
| 2018/0188045 A1 | 7/2018 | Wheeler |
| 2019/0238638 A1 | 8/2019 | Way |
| 2019/0325665 A1 | 10/2019 | Ghanbari |
| 2019/0325745 A1 | 10/2019 | Brookins |
| 2020/0074764 A1 | 3/2020 | Ghanbari |
| 2020/0302703 A1 | 9/2020 | Ghanbari |
| 2021/0133695 A1 | 5/2021 | Nichols |
| 2021/0326563 A1 | 10/2021 | Kossor |
| 2022/0232503 A1 | 7/2022 | Cheng |

OTHER PUBLICATIONS

Choo Sukjin et al: "Reliable vehicle 1-15 selection algorithm with dynamic mobility of vehicle in vehicular cloud system", 2017 19th Asia-Pacific Network Operations and Managementsymposium (APNOMS), IEEE, Sep. 27, 2017 (Sep. 27, 2017), pp. 319-321, XP033243401, DOI: 10.1109/APNOMS.2017.8094155.

\* cited by examiner

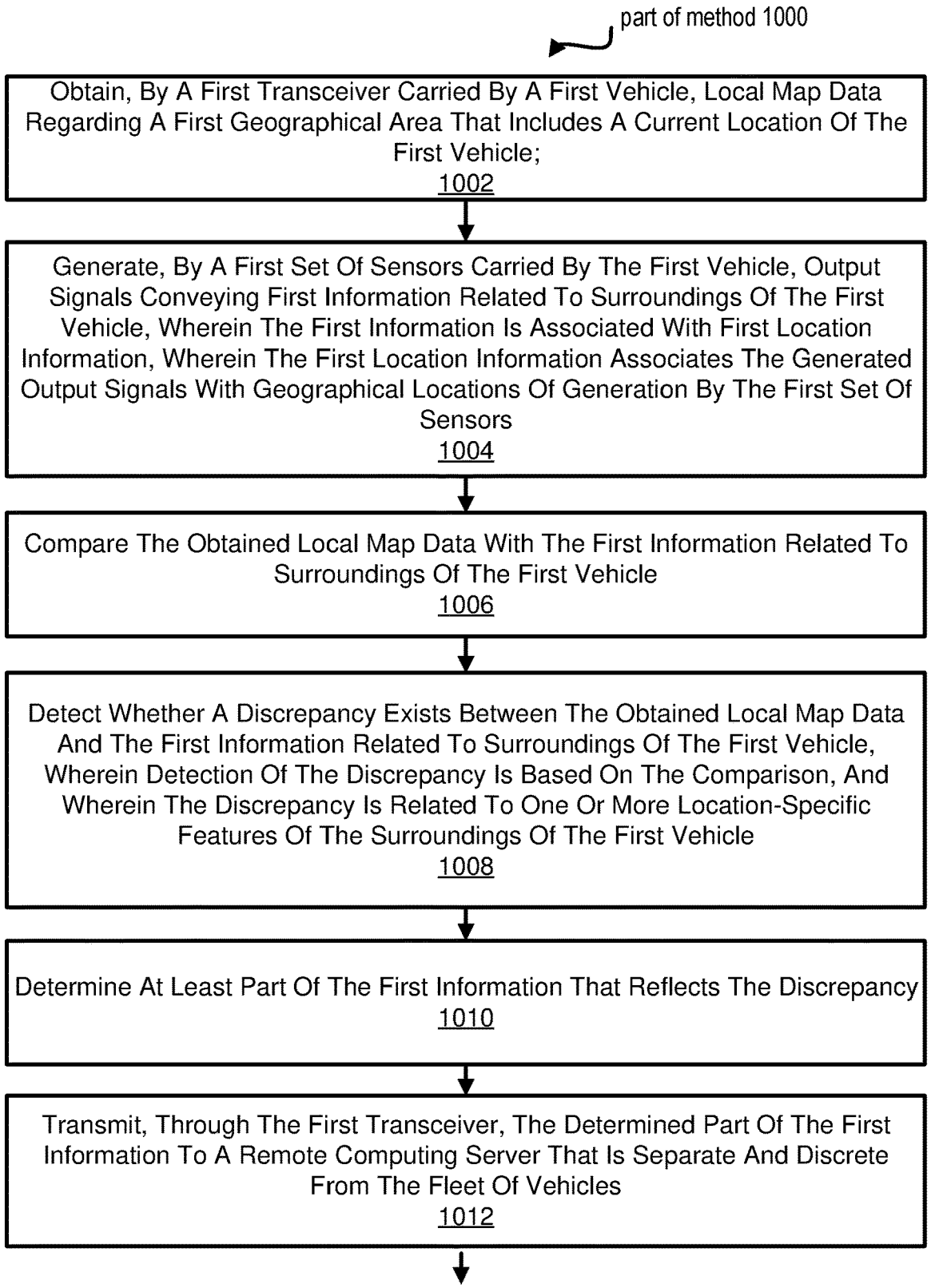
FIG. 4A
Continued on next figure, see Fig. 4B

Continued from previous figure, see Fig. 4A ← part of method 1000

Maintain A Real-Time Map Of A Geographical Area, Wherein The Real-Time Map Includes Information Related To One Or More Location-Specific Features Of The Surroundings Of The First Vehicle, Wherein The One Or More Location-Specific Features Are Not Pertaining To Current Local Traffic Conditions Or Current Local Accident Occurrences
1014

Receive The Determined Part Of The First Information From The First Transceiver
1016

Modify The Real-Time Map Based On The Received Part Of The First Information
1018

FIG. 4B

SYSTEMS AND METHODS FOR USING A DISTRIBUTED DATA CENTER TO CREATE MAP DATA

FIELD

The systems and methods disclosed herein are related to using on-board resources of individual vehicles in a fleet of vehicles as a distributed data center. In particular, information from individual vehicles is used to update a centrally maintained map that may be used by the fleet.

BACKGROUND

Systems configured to record, store, and transmit video, audio, and sensor data associated with a vehicle, e.g. responsive to an accident involving the vehicle, are known. Typically, such systems detect an accident based on data from a single sensor such as an accelerometer. Some systems store information locally for subsequent analysis. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to use data-processing resources carried by a fleet of vehicles as a distributed data center to create and update map data. The fleet of vehicles may include one or more of a first vehicle, a second vehicle, a third vehicle, and/or a fourth vehicle, and so forth. Individual vehicles may include a set of resources for data processing and/or electronic storage, including but not limited to persistent storage. Individual vehicles may include a set of sensors configured to generate output signals conveying information related to one or both of the operation of the individual vehicles and the surroundings of individual vehicles. As used herein, transmission and/or distribution of information may be considered a data processing function. As used herein, the terms data and information may be used interchangeably. The system may include sets of resources, sets of sensors, a remote computing server, and/or other components.

One or more components of the system may include one or more processors and/or other mechanisms/components for processing information. For example, a set of resources included in and/or carried by an individual vehicle may include one or more processors. For example, the remote computing server may include one or more processors. In some implementations, other vehicle-specific components, such as, by way of non-limiting example, a vehicle event recorder, may include one or more processors. In some implementations, some or all of the processors may be configured via machine-readable instructions to perform various functions. As used herein, the term "processor" is used interchangeably with the term "physical processor."

A set of resources included in and/or carried by an individual vehicle may include one or more processors, electronic storage, a transceiver, and/or other components. The first vehicle may carry a first set of resources. The second vehicle may carry a second set of resources, and so forth. The first set of resources may include a first transceiver. The second set of resources may include a second transceiver, and so forth.

Transceivers may be configured to transfer and/or receive information to and/or from other elements of the system, including but not limited to other vehicles (or components carried by other vehicles), the remote computing server, and/or other components. In some implementations, transceivers may be configured to transfer and/or receive information wirelessly, and/or otherwise provide information-distribution resources. For example, a transceiver may be configured to receive map data regarding a particular geographical area, such as an area that includes the current location of an individual vehicle. In some implementations, transceivers may be configured to obtain, measure, and/or otherwise determine one or more conditions related to data transmissions. For example, one or more current local data transmission conditions may include a current bandwidth (e.g., in MB/s), a current transmission protocol (e.g., 3G, 4G, LTE, Wi-Fi, etc.), a current transmission cost (e.g., in $/MB), and/or other conditions.

A set of sensors may be configured to generate output signals conveying information. In some implementations, the generated information may be related to one or both of the operation of one or more vehicles and the surroundings of one or more vehicles. An individual set of sensors may be carried by an individual vehicle. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, location information, operator information, and/or other information, e.g. in electronic storage.

In some implementations, a sensor may be configured to generate output signals conveying information related to the operation and/or one or more operating conditions of the vehicle. Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors. An individual sensor may be vehicle-specific.

Individual sensors may be configured to generate output signals conveying information. The information may include visual information, motion-related information, position-related information, biometric information, and/or other information. In some implementations, one or more components of the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

As mentioned, individual sensors may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

In some implementations, an image sensor may be integrated with electronic storage such that captured information may be stored, at least initially, in the integrated embedded storage of a particular vehicle. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

The system may be coupled to individual vehicles. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet.

The remote computing server may include one or more processors. The remote computing server may be remote, separate, and/or discrete from the fleet of vehicles. The one or more processors may be configured via machine-readable instructions to perform various functions. The remote computing server may be configured to facilitate presentation of a user interface to a user of the remote computing server. The user interface may be configured to facilitate interaction between one or more users and the remote computing server. For example, the user interface may be configured to receive user input from a user. The remote computing server may be further configured to transmit information based on received user input to some vehicles in the fleet or to all vehicles of the fleet. Information from individual vehicles may be processed, analyzed, and/or presented by the remote computing server.

In some implementations, a set of resources included in and/or carried by an individual vehicle may include an event recorder (also referred to as vehicle event recorder). An event recorder may be configured to generate, detect, identify, capture, and/or record information related to operating conditions of a vehicle. Information related to a vehicle may include, by way of non-limiting example, information related to and/or based on vehicle events. An event recorder may be configured to off-load and/or otherwise transmit information. In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events in real-time or near real-time during operation of a vehicle.

As used herein, the term "vehicle event" may refer to forward motion, motion in reverse, making a turn, speeding, unsafe driving speed, collisions, near-collisions, driving in a parking lot or garage, being stalled at a traffic light, loading and/or unloading of a vehicle, transferring gasoline to or from the vehicle, and/or other vehicle events in addition to driving maneuvers such as swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, performing fuel-inefficient maneuvers, and/or other driving maneuvers. Some types of vehicle events may be based on the actions or motion of the vehicle itself. Other types of vehicle events may be based on the actions taken or performed by a vehicle operator. Some types of vehicle events may be based on a combination of both the actions or motion of the vehicle itself and the actions taken or performed by a vehicle operator.

The one or more processors of the remote computing server and/or of individual sets of resources may be configured to execute one or more computer program components. The computer program components may include one or more of a presentation component, an interface component, a distribution component, a discrepancy component, a result component, a map component, a parameter determination component, a detection component, a storage component, a monetization component, and/or other components.

The presentation component may be configured to facilitate presentation of user interfaces to users and/or vehicle operators. In some implementations, the presentation component may facilitate presentation of a user interface to a user of the remote computing server. In some implementations, the presentation component may facilitate presentation of one or more user interfaces to one or more vehicle operators.

The interface component may be configured to facilitate interaction with users. For example, the interface component may facilitate interaction through user interfaces. For example, the interface component may receive user input through a user interface. In some implementations, the interface component may receive user input from the user of a remote computing server. In some implementations, the interface component may receive user input from vehicle operators.

The distribution component may be configured to transmit information from the remote computing server to all or part of a fleet of vehicles. In some implementations, the distribution component may be configured to transmit information from the remote computing server to all or part of the transceivers that are included in and/or carried by a fleet of vehicles. In some implementations, transmission may be wireless. In some implementations, transmission may be point-to-point. In some implementations, transmission may be broadcast. In some implementations, transmission may be bi-directional. For example, the distribution component may be configured to transmit local map data from the remote computing server to individual vehicles in a fleet, e.g., based on the current locations of the individual vehicles. In some implementations, the distribution component may be configured to transmit modified, adjusted, updated, and/or otherwise changed local map data from the remote computing server to individual vehicles in a fleet, e.g., based on the current locations of the individual vehicles. For example, individual transceivers may be configured to receive local map data transmitted by the distribution component. In some implementations, the presentation component, interface component, and/or one or more other components of the system may be configured to determine and/or present one or both of warnings and/or recommendations to a vehicle operator, wherein the warnings and/or recommendations are determined based on received local map data.

The discrepancy component may be configured to compare map data with information related to the surroundings of vehicles. Additionally, the discrepancy component may be configured to detect whether discrepancies exists between the map data and the information related to the surroundings of vehicles. For example, detection of discrepancies may be based on comparisons by the discrepancy component. In some implementations, discrepancies may be related to one or more location-specific features of the surroundings of vehicles.

The result component may be configured to determine information that reflects discrepancies. Additionally, the result component may be configured to transmit such determined information to the remote computing server.

The map component may be configured to maintain a map of a geographical area, e.g. a real-time map. In some implementations, the map may include information related to one or more location-specific features of the surroundings of vehicles. In some implementations, the one or more location-specific features do not pertain to current local traffic conditions (e.g., traffic jams, or slow traffic, or congestion) or current local accident occurrences (e.g., car accidents, traffic accidents). In some implementations, the one or more location-specific features do not pertain to current weather conditions, including resulting temporary characteristics of a road surface, such as wet, slippery, icy, etc. Additionally, the map component may be configured to receive information from vehicles and/or transceivers regarding detected discrepancies with local map data. The map component may further be configured to modify, adjust, update, and/or otherwise change map data based on received information regarding discrepancies. In some implementations, map data is only changed if at least a threshold number of vehicles report the same discrepancy. For example, the threshold may be 2, 3, 4, 5 or more vehicles.

In some implementations, the distribution component may be configured to transmit modified, adjusted, updated, and/or otherwise changed map data to some or all of the vehicles in the fleet. For example, in some implementations, the particular vehicles selected to receive updated map data may depend on the locations of the particular vehicles.

In some implementations, information related to one or more location-specific features may include information related to road-side construction and/or information related to road-side hazards (e.g., as indicated by flashing lights on the side of the road, obstacles in a lane, etc.). In some implementations, a location-specific hazard may be transient and/or temporary. For example, a transient hazard may exist in a particular area at a particular time of year and/or at a particular time of day, such as the sun affecting the visibility of vehicle operators. In some implementations, information related to one or more location-specific features may include information related to one or more conditions of the road surface and/or information related to lane-usage (e.g., road-type, road surface quality, lanes being switched compared to regular usage, or lanes currently not in use). In some implementations, information related to one or more location-specific features may include information related to road-closures, detours, and/or route deviations. In some implementations, information related to one or more location-specific features may include information related to local data transmission conditions (e.g., locally available bandwidth for different types of cellular data coverage). In some implementations, information related to road-side signage (e.g., the occurrence of a stop-sign or traffic light where previous none occurred, or the removal of previously existing stop-signs or traffic lights). Combinations (both logical and sequential) of any disclosed types of information are envisioned within the scope of this disclosure.

The parameter determination component may be configured to determine current operating conditions and/or vehicle parameters. The parameter determination component may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The detection component may be configured to detect vehicle events. In some implementations, vehicle events may be related to current operating conditions of a vehicle. For example, a vehicle event may be based on comparing one or more vehicle parameters with one or more thresholds.

The storage component may be configured to store information in electronic storage. For example, the information may be stored in the electronic storage of a particular vehicle. In some implementations, the stored information may be related to detected vehicle events, detected discrepancies, determined vehicle parameters, and/or other information. In some implementations, the storage component may be configured to store vehicle event records of detected vehicle events in electronic storage.

The monetization component may be configured to exchange access to at least a part of a map for compensation. For example, different fleets may subscribe to receive different types of maps including different types of data.

In some implementations, one or more components of the system may be configured to obtain, receive, and/or determine contextual information related to environmental conditions near and/or around vehicles. Environmental conditions may be related to weather conditions, traffic conditions, visibility, and/or other environmental conditions. In some implementations, one or more environmental conditions may be received from one or more sources external to the vehicle. For example, a source external to the vehicle may include an external provider.

In some implementations, detection of vehicle events may further be based one or more types of contextual information. In some implementations, detection may be accomplished and/or performed at the vehicle.

As used herein, any association (or relation, or reflection, or indication, or correspondency) involving vehicles, sensors, vehicle events, operating conditions, parameters, thresholds, functions, notifications, discrepancies, location-specific features, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4A-4B illustrate a method to use data-processing resources carried by a fleet of vehicles as a distributed data center to create and update map data, in accordance with one or more embodiments.

DETAILED DESCRIPTION

Figure 1:
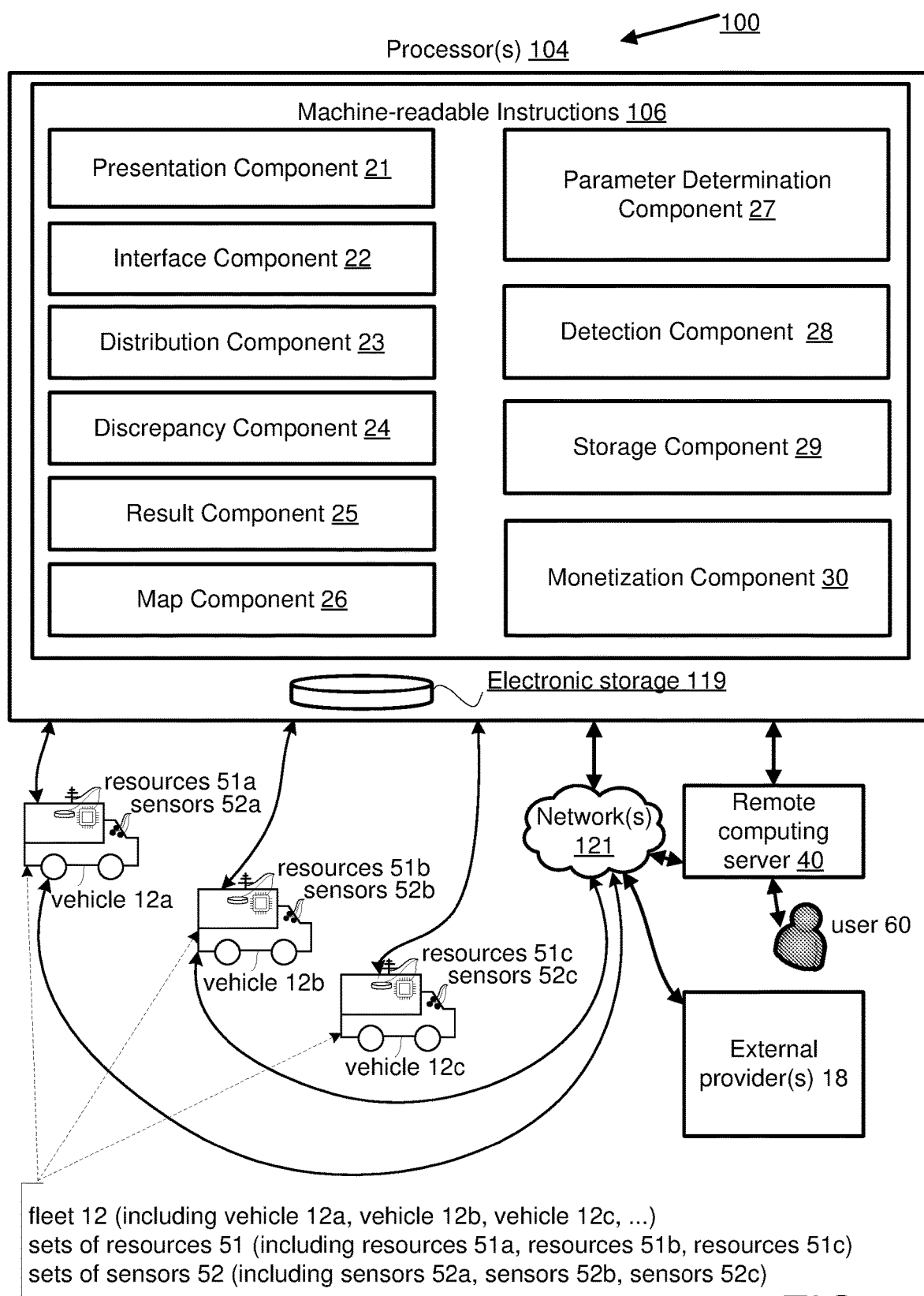
FIGS. 1-2 illustrate systems configured to use data-processing resources carried by a fleet of vehicles as a distributed data center to create and update map data, in accordance with one or more embodiments.

FIG. 1 illustrates a system 100 configured to use data-processing resources carried by a fleet 12 of vehicles as a distributed data center. Fleet 12 may include a first vehicle 12a, a second vehicle 12b, a third vehicle 12c, and so forth. As used here, the term fleet may refer to a set of at least 5 vehicles, at least 10 vehicles, at least 100 vehicles, at least 1000 vehicles, and/or another number of vehicles. Individual vehicles may include a set of resources for data processing and/or electronic storage, including but not limited to persistent storage. Individual vehicles may include a set of sensors configured to generate output signals conveying information related to the operation of the individual vehicles. System 100 may include sets of resources 51, sets of sensors 52, a remote computing server 40, electronic storage 119, and/or other components. In some implementations, system 100 may be a distributed data center, include a distributed data center, or act as a distributed data center.

One or more components of system 100 may include one or more processors 104 and/or other mechanisms/components for processing information. For example, a set of resources included in and/or carried by an individual vehicle may include one or more processors. For example, remote computing server 40 may include one or more processors. In some implementations, other vehicle-specific components, such as, by way of non-limiting example, a vehicle event recorder, may include one or more processors. In some implementations, some or all of the processors may be configured via machine-readable instructions to perform various functions. One or more components of system 100 may include electronic storage 119 and/or other mechanisms/components for storing information. For example, a set of resources included in and/or carried by an individual vehicle may include electronic storage. For example, remote computing server 40 may include electronic storage. In some implementations, other vehicle-specific components, such as, by way of non-limiting example, a vehicle event recorder, may include electronic storage.

Figure 2:
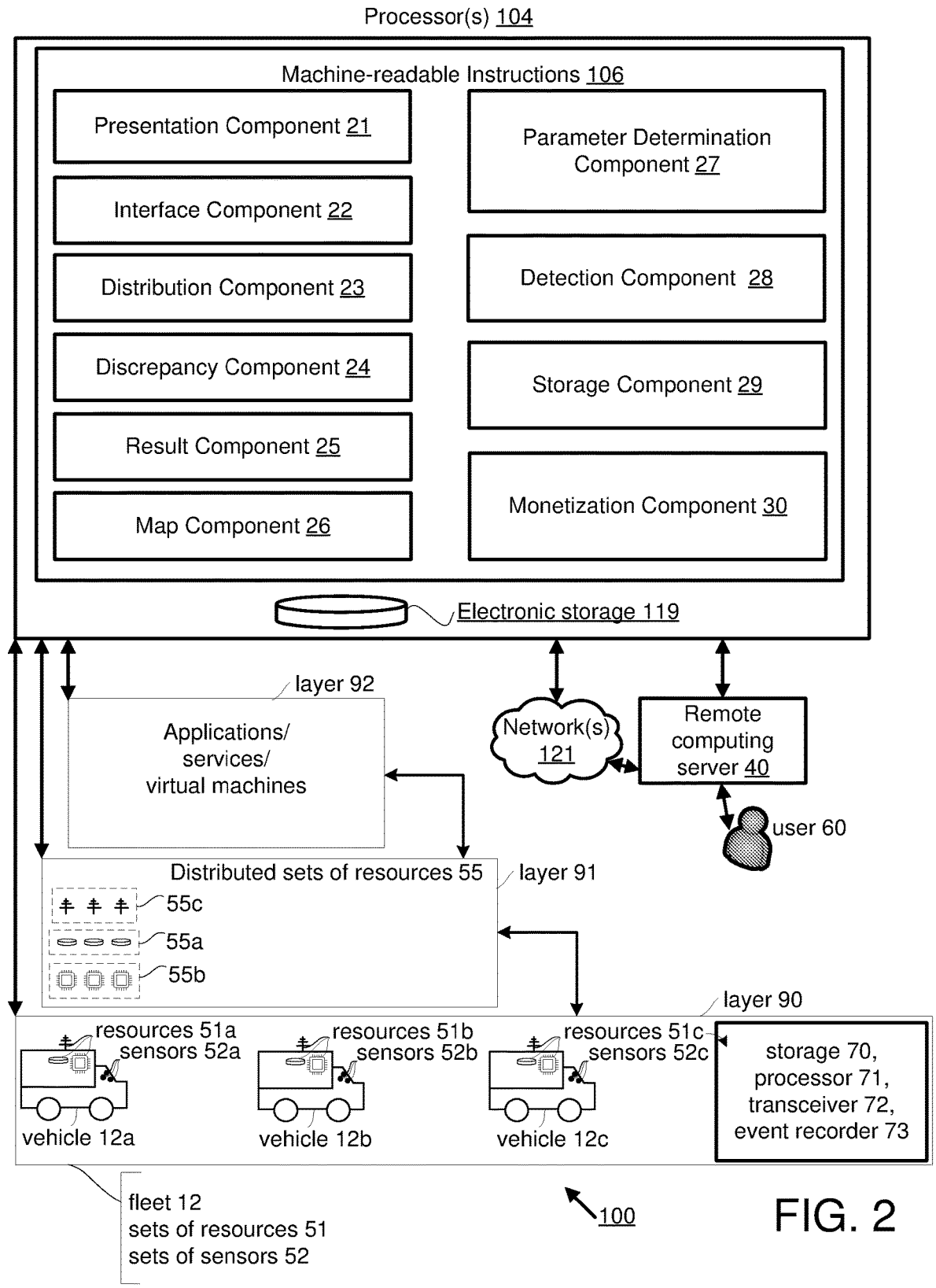

By way of non-limiting example, as shown in FIG. 2, individual sets of resources 51 included in and/or carried by an individual vehicle (e.g. set of resources 51c carried by vehicle 12c) may include one or more of electronic storage 70, a processor 71, a transceiver 72, an event recorder 73, and/or other components. First vehicle 12a may carry a first set of resources 51a. Second vehicle 12b may carry a second set of resources 51b. Third vehicle 12c may carry a third set of resources 51c, and so forth. Each set of resources may include instances of one or more of electronic storage 70, a processor 71, a transceiver 72, an event recorder 73, and/or other components. First set of resources 51a may include a first transceiver. Second set of resources 51b may include a second transceiver, and so forth. For example, first set of resources 51a may include first electronic storage, second set of resources 51b may include second electronic storage, third set of resources 51c may include third electronic storage (e.g., storage 70), and so forth. For example, first set of resources 51a may include one or more processors, second set of resources 51b may include one or more processors, third set of resources 51c may include one or more processors (e.g., processor 71), and so forth.

Transceivers may be configured to transfer and/or receive information to and/or from other elements of system 100, including but not limited to other vehicles (or components carried by other vehicles in fleet 12), remote computing server 40, and/or other components. In some implementations, transceivers may be configured to transfer and/or receive information wirelessly, and/or otherwise provide information-distribution resources. For example, a transceiver may be configured to receive map data regarding a particular geographical area, such as an area that includes the current location of an individual vehicle. In some implementations, transceivers may be configured to obtain, receive, measure, and/or otherwise determine one or more conditions related to data transmissions. For example, one or more current local data transmission conditions may include a current bandwidth (e.g., in MB/s), a current transmission protocol (e.g., 3G, 4G, LTE, Wi-Fi, etc.), a current transmission cost (e.g., in $/MB), and/or other conditions.

Referring to FIG. 1, a set of sensors 52 may be configured to generate output signals conveying information. In some implementations, the generated information may be related to the operation of one or more vehicles in fleet 12. In some implementations, the generated information may be related to the surroundings of one or more vehicles in fleet 12. An individual set of sensors 52 may be carried by an individual vehicle. First vehicle 12a may carry a first set of sensors 52a. Second vehicle 12b may carry a second set of sensors 52b. Third vehicle 12c may carry a third set of sensors 52c, and so forth. The generated information may include timing information, location information, operator information, and/or other information. In some implementations, generated information may be associated with timing information (e.g., from a timer), location information, operator information, and/or other information.

In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, location information may associate and/or otherwise relate the generated output signals with one or more locations of generation (or, locations at the moment of generation) by one or more particular sensors. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources 51 may be configured to store generated information, timing information, location information, operator information, and/or other information, e.g. in electronic storage.

A sensor may be configured to generate output signals conveying information related to the operation and/or one or more operating conditions of a vehicle. Information related to the operation of a vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. The sensors of a particular vehicle may be referred to as a set of sensors. An individual sensor is vehicle-specific.

Information related to current operating conditions of a vehicle may include feedback information from one or more of the mechanical systems of the vehicle, and/or other information. The mechanical systems of a vehicle may include, for example, the engine, the drive train, the lighting systems (e.g., headlights, brake lights), the braking system, the transmission, fuel delivery systems, and/or other mechanical systems. The mechanical systems of a vehicle may include one or more mechanical sensors, electronic sensors, and/or other sensors that generate the output signals (e.g., seat belt sensors, tire pressure sensors, etc.). In some implementations, at least one of the sensors carried by a vehicle may be a vehicle system sensor included in an ECM system of the vehicle.

In some implementations, information related to current operating conditions of a vehicle may include information related to the environment in and/or around the vehicle. The vehicle environment may include spaces in and around an interior and an exterior of the vehicle. The information may include information related to movement of the vehicle, an orientation of the vehicle, a geographic position of the vehicle, a spatial position of the vehicle relative to other objects, a tilt angle of the vehicle, an inclination/declination angle of the vehicle, and/or other information. In some implementations, the output signals conveying information may be generated via non-standard aftermarket sensors installed in the vehicle. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the set of sensors carried by a vehicle may include multiple cameras positioned around the vehicle and synchronized together to provide a 360-degree view of the inside of the vehicle (e.g., the cabin) and/or a 360-degree view of the outside of the vehicle.

Although individual sets of sensors 52a, 52b, and 52c are depicted in FIG. 1 as having three elements, this is not intended to be limiting. For individual vehicles, a set of sensors 142 may include one or more sensors located adjacent to and/or in communication with the various mechanical systems of the vehicle, in one or more positions (e.g., at or near the front of the vehicle, at or near the back of the vehicle, on the side of the vehicle, on or near the windshield of the vehicle, facing outward and/or inward, etc.) to accurately acquire information representing the vehicle environment (e.g. visual information, spatial information, orientation information), and/or in other locations. For example, in some implementations, a set of sensors for a particular vehicle may be configured such that a first sensor is located near or in communication with a rotating tire of the vehicle, and a second sensor located on top of the vehicle is in communication with a geolocation satellite.

Individual sensors may be configured to generate output signals conveying information. The information may include visual information, motion-related information, position-related information, biometric information, and/or other information. In some implementations, one or more components of system 100 may determine one or more parameters that are measured, derived, estimated, approximated, and/or otherwise determined based on one or more output signals generated by one or more sensors.

Output signals generated by individual sensors (and/or information based thereon) may be stored and/or transferred in electronic files. In some implementations, output signals generated by individual sensors (and/or information based thereon) may be streamed to one or more other components of system 100.

Individual sensors may include image sensors, cameras, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, or other sensor. Output signals generated by individual image sensors (and/or information based thereon) may be stored and/or transferred in electronic files.

System 100 may be coupled to individual vehicles. For example, system 100 may be communicatively coupled to individual vehicles and/or to components carried by individual vehicles, including but not limited to transceivers. For example, components of system 100 may be configured to communicate through one or more networks 121. The one or more networks 121 may, by way of non-limiting example, include the internet.

Remote computing server 40 may include one or more processors 104. Remote computing server 40 may be remote, separate, and/or discrete from the fleet of vehicles 12. Remote computer server 40 may be physically unconnected to any car in the fleet. One or more processors 104 may be configured via machine-readable instructions 106 to perform various functions. Remote computing server 40 may be configured to facilitate presentation of a user interface to a user 60 of remote computing server 40. The user interface may be configured to facilitate interaction between one or more users and remote computing server 40. For example, the user interface may be configured to receive user input from user 60. In some implementations, the received input may represent a query, e.g. a distributed query. The query may be related to information stored on electronic storage, e.g. in multiple sets of resources of multiple vehicles. Alternatively, and/or simultaneously, the query may be related to one or more vehicle operators. Remote computing server 40 may be further configured to transmit information based on the query and/or otherwise related to the query to some vehicles in the fleet or to all vehicles of the fleet. Results and/or other responses from individual vehicles may be received, aggregated, and/or presented by remote computing server 40.

Figure 3:
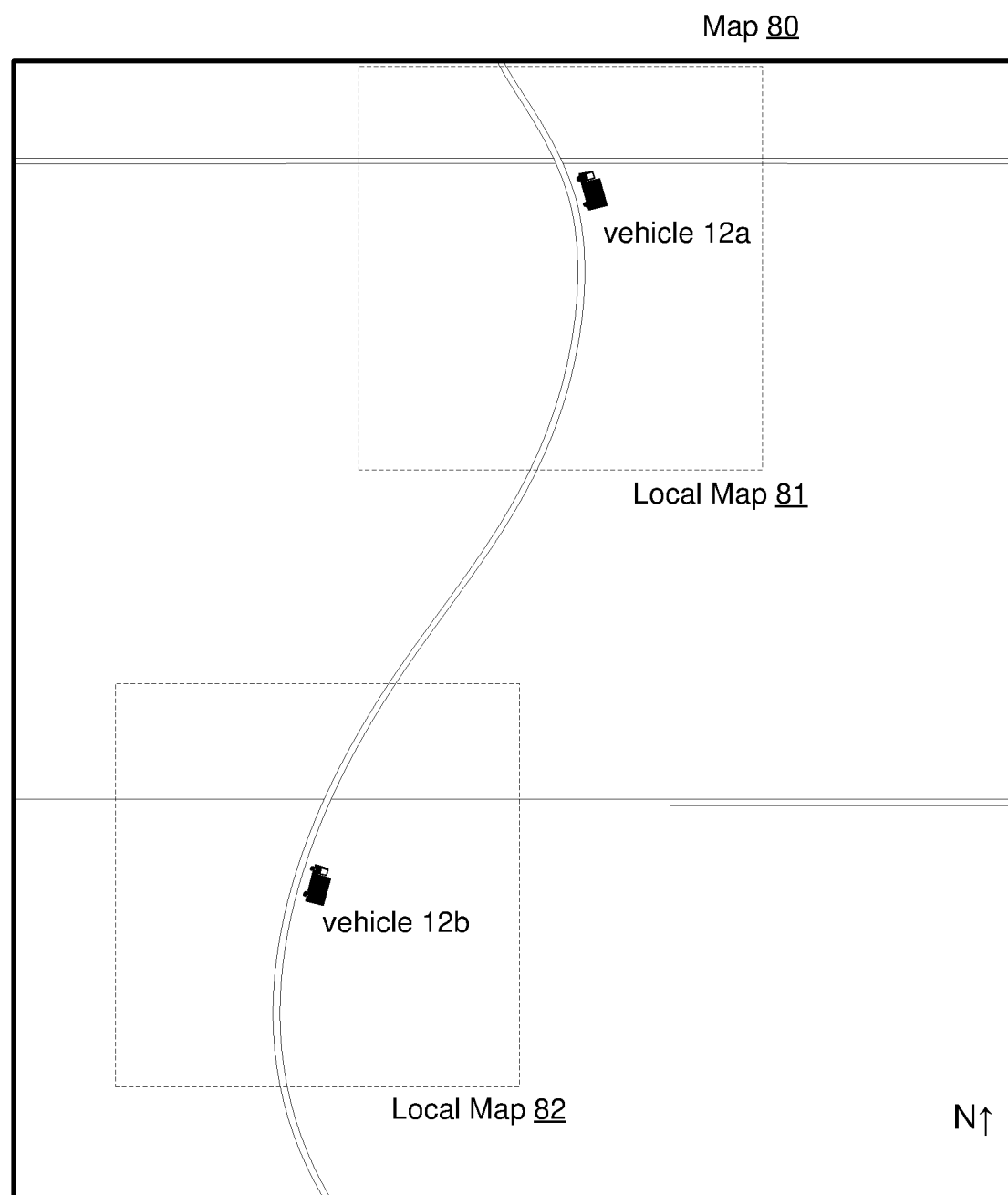
FIG. 3 illustrates exemplary (local) maps to be used with a system configured to use data-processing resources carried by a fleet of vehicles as a distributed data center, in accordance with one or more embodiments.

By way of non-limiting example, FIG. 3 illustrates a map 80 maintained by remote computing server 40. Map 80 may include information about individual vehicles, e.g. locations of first vehicle 12a and second vehicle 12b, as well as features of interest to vehicles and vehicle operators, such as roads. A remote computing server, distribution component, and/or other component of the system described in this disclosure may distribute local map 81 to first vehicle 12a, and local map 82 to second vehicle 12b. As depicted in FIG. 3, both vehicles may be heading north, towards the top of map 80. First vehicle 12a may detect a discrepancy between local map 81 (received through the distribution described above) and information related to the surroundings of first vehicle 12a. This information may be conveyed through output signals generated by first set of sensors 52a (shown in FIG. 1) carried by first vehicle 12a. First vehicle 12a may subsequently determine information that reflects the detected discrepancy and transmit this information to the remote computing server. The remote computing server may receive this information and use it to modify map 80. As second vehicle 12b travels northwards, its local map will at some point include information that was modified due to the detected discrepancy. By way of non-limiting example, the discrepancy may be related to one or more location-specific features, such as road-side construction and/or information related to road-side hazards (e.g., as indicated by flashing lights on the side of the road, obstacles in a lane, etc.), one or more conditions of the road surface and/or information related to lane-usage (e.g., road-type, road surface quality, lanes being switched compared to regular usage, or lanes currently not in use), road-closures, detours, and/or route deviations, local data transmission conditions (e.g., locally available bandwidth for different types of cellular data coverage), road-side signage (e.g., the occurrence of a stop-sign or traffic light where previous none occurred, or the removal of previously existing stop-signs or traffic lights), and/or other location-specific features.

Referring to FIG. 2, in some implementations, a set of resources included in and/or carried by an individual vehicle may include an event recorder (also referred to as vehicle event recorder). For example, set of resources 51c carried by the vehicles may include event recorder 73, as shown in FIG. 2. An event recorder may be configured to generate, detect, identify, capture, and/or record information related to operating conditions of a vehicle. Information related to a vehicle may include, by way of non-limiting example, information related to and/or based on vehicle events. An event recorder may be configured to off-load and/or otherwise transmit information (e.g. through use of a transceiver such as transceiver 72). In some implementations, an event recorder may include one or more physical processors, electronic storage, and/or other components. In some implementations, an event recorder may detect vehicle events based on a comparison of the information conveyed by the output signals from one or more sensors to predetermined (variable and/or fixed) values, threshold, functions, and/or other information. An event recorder may identify vehicle events in real-time or near real-time during operation of a vehicle.

In some implementations, system 100 may be configured to effectuate management of distributed sets of resources 55. In some implementations, an individual distributed set of resources may include resources of the same or similar type. For example, a first distributed set of resources 55a may include resources for electronic storage of information, a second distributed set of resources 55b may include resources that provide information-processing capabilities, a third distributed set of resources 55c may include resources that provide information-distribution capabilities, and so forth. For example, the resources for electronic storage of information may include a first data store (included in first set of resources 51a for the first vehicle), a second data store (included in the second set of resources 51b for the second vehicle), a third data store (included in the third set of resources 51c for the third vehicle), and so forth. For example, system 100 may be configured to manage a distributed data store that includes data stored in the first data store, the second data store, the third data store, and so forth. In some implementations, virtualization component 30 may be configured to effectuate management of different layers of virtualization of resources. For example, the lowest layer 90 may include the physical resources, a next layer 91 may include the distributed sets of resources, and another next layer 92 may include distributed APIs, distributed applications, and/or services available to users of remote computing server 40. The API, application, and/or service layer may include support for different functions, services, and/or for different operating systems, e.g. through virtual machines. In some implementations, virtualization component 40 may be configured to support different types of virtualization, including but not limited to server virtualization, desktop virtualization, application virtualization, network virtualization, storage virtualization, and/or other types of virtualization.

Referring to FIG. 1, one or more processors 104 of remote computing server 40 and/or of individual sets of resources 51 may be configured to execute one or more computer program components. The computer program components may include one or more of a presentation component 21, an interface component 22, a distribution component 23, a discrepancy component 24, a result component 25, a map component 26, a parameter determination component 27, a detection component 28, a storage component 29, a monetization component 30, and/or other components.

Presentation component 21 may be configured to facilitate presentation of user interfaces to users and/or vehicle operators. In some implementations, presentation component 21 may facilitate presentation of a user interface to user 60 of remote computing server 40. In some implementations, presentation component 21 may facilitate presentation of a user interface to one or more vehicle operators. This enables information to be communicated between a vehicle operator and/or other components of system 100. As an example, a warning regarding a dangerous driving maneuver and/or vehicle event may be displayed to the driver of the vehicle via such a user interface, e.g. as a notification.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as a user interface. Other exemplary input devices and techniques adapted for use by users and/or vehicle operators include, but are not limited to, an RS-232 port, RF link, an IR link, modem (telephone, cable, and/or other modems), a cellular network, a Wi-Fi network, a local area network, and/or other devices and/or systems. In short, any technique for communicating information is contemplated by the present disclosure as a user interface.

Interface component 22 may be configured to facilitate interaction with users and/or vehicle operators. For example, a user may be a fleet manager, or someone investigating fleet operations. Interface component 22 may facilitate interaction through user interfaces. For example, interface component 22 may receive user input through a user interface. In some implementations, interface component 22 may receive user input from user 60 of remote computing server 40. In some implementations, the received user input may represent a distributed query. For example, an entire fleet of vehicles 12 (or any subset thereof) may be queried for particular information. In some implementations, a distributed query or other request may be associated with one or more response constraints. For example, distribution component 23 may be configured to transmit the one or more response constraints to all or part of fleet of vehicles 12.

In some implementations, interface component 22 may be configured to effectuate a review presentation to a user or reviewer, e.g. user 60. A review presentation may be based on information related to one or more detected vehicle events and/or discrepancies. In some implementations, a review presentation may provide a prompt to a user or reviewer to provide manual review input, e.g., regarding one or more detected vehicle events and/or discrepancies. For example, a reviewer may be prompted via a question, an inquiry, and/or via other types of prompts. For example, a reviewer may be asked whether a driver was wearing a seatbelt at a particular point in time, or whether one or more lanes appear to be closed. A review presentation may be implemented as a user interface to facilitate interaction for a reviewer. For example, such a user interface may receive review input from a reviewer, including but not limited to manual review input. In some implementations, review input may be responsive to a prompt. In some implementations, a vehicle operator may receive information based on review input. Such information may be referred to as feedback. For example, a user interface for a vehicle operator (this may be referred to as a driver interface) may present a message to a vehicle operator to "remember to wear your seatbelt," responsive to particular review input received from a reviewer (through a different user interface). In some implementations, a driver interface may be configured to detect a vehicle operator's response to feedback. In some implementations, the response by a vehicle operator may be specific to the feedback received through the driver interface. In some implementations, review input may be used to update and/or change a map.

Distribution component 23 may be configured to transmit information from remote computing server 40 to all or part of fleet of vehicles 12. In some implementations, distribution component 23 may be configured to transmit information from remote computing server 40 to all or part of the transceivers that are included in and/or carried by fleet of vehicles 12. In some implementations, transmission may be wireless. In some implementations, transmission may be point-to-point. In some implementations, transmission may be broadcast. In some implementations, transmission may be bi-directional. For example, distribution component 23 may be configured to transmit local map data from remote computing server 40 to individual vehicles in a fleet, e.g., based on the current locations of the individual vehicles. For example, distribution component 23 may be configured to transmit wireless query information from remote computing server 40 to some or all of the vehicles in fleet 12. In some implementations, distribution component 23 may be configured to transmit modified, adjusted, updated, and/or otherwise changed local map data from remote computing server 40 to individual vehicles in a fleet, e.g., based on the current locations of the individual vehicles. For example, individual transceivers may be configured to receive local map data transmitted by distribution component 23. In some implementations, presentation component 21, interface component 22, and/or one or more other components of system 100 may be configured to determine and/or present one or both of warnings and/or recommendations to a vehicle operator, wherein the warnings and/or recommendations are determined based on received local map data (or modified, adjusted, updated, and/or otherwise changed local map data).

Discrepancy component 24 may be configured to compare map data with information related to the surroundings of vehicles. Additionally, discrepancy component 24 may be configured to detect whether discrepancies exists between the map data and the information related to the surroundings of vehicles. For example, detection of discrepancies may be based on comparisons by discrepancy component 24. In some implementations, discrepancies may be related to one or more location-specific features of the surroundings of vehicles.

Result component 25 may be configured to determine information that reflects discrepancies. Additionally, result component 25 may be configured to transmit such determined information to remote computing server 40.

Map component 26 may be configured to maintain a map of a geographical area, e.g. a real-time map. In some implementations, the map may include information related to one or more location-specific features of the surroundings of vehicles. In some implementations, the one or more location-specific features do not pertain to current local traffic conditions (e.g., traffic jams, or slow traffic, or congestion) or current local accident occurrences (e.g., car accidents, traffic accidents). In some implementations, the one or more location-specific features do not pertain to current weather conditions, including resulting characteristics of a road surface, such as wet, slippery, icy, etc. Additionally, map component 26 may be configured to receive information from vehicles and/or transceivers regarding detected discrepancies with local map data. Map component 26 may further be configured to modify, adjust, update, and/or otherwise change map data based on received information regarding discrepancies. In some implementations, map data is only changed if at least a threshold number of vehicles report the same discrepancy. For example, the threshold may be 2, 3, 4, 5 or more vehicles.

In some implementations, distribution component 23 may be configured to transmit modified, adjusted, updated, and/or otherwise changed map data to some or all of the vehicles in the fleet. For example, in some implementations, the particular vehicles selected to receive updated map data may depend on the locations of the particular vehicles. In some implementations, responsive to receiving at least part of a modified map from remote computing server 40, an individual vehicle may be configured to determine one or both of warnings and/or recommendations to the vehicle operator of an individual vehicle, wherein the one or both of warnings and/or recommendations are caused by the modification of the map. Subsequently, the individual vehicle may be configured to effectuate presentation of the one or both of warnings and/or recommendations to the vehicle operator of the individual vehicle.

In some implementations, information related to one or more location-specific features may include information related to road-side construction and/or information related to road-side hazards (e.g., as indicated by flashing lights on the side of the road, obstacles in a lane, etc.). In some implementations, a location-specific hazard may be transient and/or temporary. For example, a transient hazard may exist in a particular area at a particular time of year and/or at a particular time of day, such as the sun affecting the visibility of vehicle operators. In some implementations, information related to a location-specific feature and/or hazard may be used to adjust a threshold used to detect vehicle events, such as a threshold used to warn vehicle operators regarding a short-following event (e.g., where a vehicle is too close to the vehicle in front of it).

In some implementations, information related to one or more location-specific features may include information related to one or more conditions of the road surface and/or information related to lane-usage (e.g., road-type, road surface quality, lanes being switched compared to regular usage, or lanes currently not in use). In some implementations, information related to one or more location-specific features may include information related to road-closures, detours, and/or route deviations. In some implementations, information related to one or more location-specific features may include information related to local data transmission conditions (e.g., locally available bandwidth for different types of cellular data coverage). In some implementations, information related to road-side signage (e.g., the occurrence of a stop-sign or traffic light where previous none occurred, or the removal of previously existing stop-signs or traffic lights). In some implementations, road signs and/or road-side infrastructure may support Dedicated Short-Range Communications or DSRC. Vehicles that support DSRC may receive and/or transmit to such road signs and/or road-side infrastructure. In some implementations, information received through DSRC may be information related to one or more location-specific features, and may be added to a map or used to detect discrepancies. In some implementations, DSRC and/or other short-range communication protocols may be used to enable vehicle-to-vehicle communication, which may be used to detect vehicle events, warn vehicle operators, and/or provide other features or services to vehicle operators or fleet managers. Combinations (both logical and sequential) of any disclosed types of information are envisioned within the scope of this disclosure.

Parameter determination component 27 may be configured to determine current operating conditions and/or vehicle parameters. Parameter determination component 27 may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, parameter determination component 27 may be configured to determine one or more of the current operating conditions one or more times in an ongoing manner during operation of the vehicle.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of the vehicle (such as mass and/or number of axles, for example), a tilt angle of the vehicle, an inclination/declination angle of the vehicle, and/or other parameters.

The physical characteristics of a vehicle may be physical features of a vehicle set during manufacture of the vehicle, during loading of the vehicle, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by the vehicle (e.g., food items, livestock, construction materials, hazardous materials, an oversized load, a liquid), vehicle trailer type, trailer length, trailer weight, trailer height, a number of axles, and/or other physical features.

In some implementations, parameter determination component 27 may be configured to determine one or more vehicle parameters based on the output signals from at least two different sensors. For example, parameter determination component 27 may determine one or more of the vehicle parameters based on output signals from a sensor related to the ECM system and an external aftermarket added sensor. In some implementations, a determination of one or more of the vehicle parameters based on output signals from at least two different sensors may be more accurate and/or precise than a determination based on the output signals from only one sensor. For example, on an icy surface, output signals from an accelerometer may not convey that a driver of the vehicle is applying the brakes of the vehicle. However, a sensor in communication with the braking system of the vehicle would convey that the driver is applying the brakes. A value of a braking parameter may be determined based on the braking sensor information even though the output signals from the accelerometer may not convey that the driver is applying the brakes.

Parameter determination component 27 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of the vehicle. In some implementations, one or more of the vehicle parameters may be determined at regular time intervals during operation of the vehicle. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, parameter determination component 27 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 100, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through a user interface.

Detection component 28 may be configured to detect vehicle events. In some implementations, vehicle events may be related to current operating conditions of a vehicle. For example, a vehicle event may be based on comparing one or more vehicle parameters with one or more thresholds.

In some implementations, detection component 28 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. Detection component 28 may be configured such that force maintained over a period of time at a particular vehicle speed may decrease a threshold force the longer that the force is maintained. Detection component 28 may be configured such that, combined with engine load data, throttle data may be used to determine a risky event, a fuel wasting event, and/or other events.

Storage component 29 may be configured to store information in electronic storage. For example, the information may be stored in the electronic storage of a particular vehicle. In some implementations, the stored information may be related to detected vehicle events, detected discrepancies, determined vehicle parameters, and/or other information. In some implementations, storage component 29 may be configured to store vehicle event records of detected vehicle events in electronic storage.

Monetization component 30 may be configured to exchange access to at least a part of a map for compensation. For example, different fleets may subscribe to receive different types of maps including different types of data.

In some implementations, one or more components of system 100 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, one or more environmental conditions may be received from one or more sources external to the vehicle. For example, a source external to the vehicle may include one or more external providers 18. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

In some implementations, detection of vehicle events may further be based one or more types of contextual information. In some implementations, detection may be accomplished and/or performed at the vehicle. In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined. In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at the vehicle speeds less than about 10 kph. The −0.3 g and/or +0.3 g criteria may be scaled as the vehicle increases in speed. In some implementations, the −0.3 g and/or +0.3 g criteria may be scaled (e.g., reduced) by about 0.0045 g per kph of speed over 10 kph. To prevent too much sensitivity, the lateral force criteria may be limited to about +/−0.12 g, regardless of the speed of the vehicle, for example. In some implementations, the criterion for the given period of time between swerves may be about 3 seconds.

Electronic storage 119 may comprise electronic storage media that electronically stores information. The electronic storage media of electronic storage 119 may comprise one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 119 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 119 may store software algorithms, recorded video event data, information determined by processor 104, information received via a user interface, and/or other information that enables system 100 to function properly. Electronic storage 119 may be (in whole or in part) a separate component within system 100, or electronic storage 119 may be provided (in whole or in part) integrally with one or more other components of system 100.

As described above, processor 104 may be configured to provide information-processing capabilities in system 100. As such, processor 104 may comprise one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may comprise a plurality of processing units. These processing units may be physically located within the same device (e.g., a vehicle event recorder), or processor 104 may represent processing functionality of a plurality of devices operating in coordination.

Processor 110 may be configured to execute components 21-30 by software; hardware; firmware; some combination of software, hardware, and/or firmware; and/or other mechanisms for configuring processing capabilities on processor 110. It should be appreciated that although components 21-30 are illustrated in FIG. 1 as being co-located within a single processing unit, in implementations in which processor 104 comprises multiple processing units, one or more of components 21-30 may be located remotely from the other components. The description of the functionality provided by the different components 21-30 described herein is for illustrative purposes, and is not intended to be limiting, as any of components 21-30 may provide more or less functionality than is described. For example, one or more of components 21-30 may be eliminated, and some or all of its functionality may be provided by other components 21-30. As another example, processor 104 may be configured to execute one or more additional components that may perform some or all of the functionality attributed below to one of components 21-30.

FIGS. 4A-4B illustrate a method 1000 to create and update map data. The operations of method 1000 presented below are intended to be illustrative. In some implementations, method 1000 may be accomplished with one or more additional operations not described, and/or without one or more of the operations discussed. Additionally, the order in which the operations of method 1000 are illustrated (in FIGS. 4A-4B) and described below is not intended to be limiting. In some implementations, two or more of the operations may occur substantially simultaneously.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on one or more electronic storage mediums. The one or more processing devices may include one or more devices configured through hardware, firmware, and/or software to be specifically designed for execution of one or more of the operations of method 1000.

Referring to FIGS. 4A-4B and method 1000, at an operation 1002, local map data is obtained, by a first transceiver carried by the first vehicle, regarding a first geographical area that includes a current location of the first vehicle. In some embodiments, operation 1002 is performed by a set of resources the same as or similar to set of resources 51a (shown in FIG. 1 and described herein).

At an operation 1004, output signals are generated, by a first set of sensors carried by the first vehicle, the output signals conveying first information related to surroundings of the first vehicle. The first information is associated with first location information. The first location information associates the generated output signals with geographical locations of generation by the first set of sensors. In some embodiments, operation 1004 is performed by a set of sensors the same as or similar to set of sensors 52a (shown in FIG. 1 and described herein).

At an operation 1006, the obtained local map data is compared with the first information related to surroundings of the first vehicle. In some embodiments, operation 1006 is performed by a discrepancy component the same as or similar to discrepancy component 24 (shown in FIG. 1 and described herein).

At an operation 1008, it is detected whether a discrepancy exists between the obtained local map data and the first information related to surroundings of the first vehicle. Detection of the discrepancy is based on the comparison. The discrepancy is related to one or more location-specific features of the surroundings of the first vehicle. In some embodiments, operation 1008 is performed by a discrepancy component the same as or similar to discrepancy component 24 (shown in FIG. 1 and described herein).

At an operation 1010, at least part of the first information is determined that reflects the discrepancy. In some embodiments, operation 1010 is performed by a result component the same as or similar to result component 25 (shown in FIG. 1 and described herein).

At an operation 1012, the determined part of the first information is transmitted to a remote computing server that is separate and discrete from the fleet of vehicles. In some embodiments, operation 1012 is performed by a result component the same as or similar to result component 25 (shown in FIG. 1 and described herein).

At an operation 1014, a real-time map of a geographical area is maintained. The real-time map includes information related to one or more location-specific features of the surroundings of the first vehicle. The one or more location-specific features are not pertaining to current local traffic conditions or current local accident occurrences. In some embodiments, operation 1014 is performed by a map component the same as or similar to map component 26 (shown in FIG. 1 and described herein).

At an operation 1016, the determined part of the first information is received from the first transceiver. In some embodiments, operation 1016 is performed by a map component the same as or similar to map component 26 (shown in FIG. 1 and described herein).

At an operation 1018, the real-time map is modified based on the received part of the first information. In some embodiments, operation 1018 is performed by a map component the same as or similar to map component 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to use data-processing resources carried by a fleet of vehicles as a distributed data center to create and update map data, the system configured to couple with the fleet of vehicles, wherein the fleet includes a first vehicle located near first surroundings and a second vehicle located near second surroundings, the system comprising:

a remote computing server including one or more processors, wherein the remote computing server is separate and discrete from the fleet of vehicles, and wherein the one or more processors are configured by machine-readable instructions to:

maintain a real-time map of a geographical area, wherein the real-time map includes information related to one or more location-specific features of the first surroundings and the second surroundings, wherein the one or more location-specific features are not pertaining to current local traffic conditions;

receive, from a first transceiver carried by the first vehicle, first discrepancy information, wherein the first discrepancy information reflects a first detected discrepancy between the real-time map and the first surroundings of the first vehicle that have been detected based on first output signals generated by a first set of sensors carried by the first vehicle, wherein the first detected discrepancy is based on a first comparison of the real-time map data and the first surroundings of the first vehicle;

receive, from a second transceiver carried by the second vehicle, second discrepancy information, wherein the second discrepancy information reflects a second detected discrepancy between the real-time map and the second surroundings of the second vehicle that have been detected based on second output signals generated by a second set of sensors carried by the second vehicle, wherein the second detected discrepancy is based on a second comparison of the real-time map data and the second surroundings of the second vehicle;

compare, through a particular comparison, the first discrepancy information with the second discrepancy information;

determine, based on the particular comparison, that the first detected discrepancy corresponds to the second detected discrepancy;

determine that a threshold number of more than one different vehicles has detected the same discrepancy, wherein the threshold number of more than one different vehicles includes the first vehicle and the second vehicle;

responsive to the threshold number of more than one different vehicles having detected the same discrepancy, modify the real-time map, wherein a modification is based on one or both of the received first discrepancy information and the received second discrepancy information;

transmit at least a first part of the modified real-time map to the first transceiver of the first vehicle; and transmit at least a second part of the modified real-time map to the second transceiver of the second vehicle.

2. The system of claim 1, wherein the information related to one or more location-specific features includes information related to road-side construction and/or information related to road-side hazards.

3. The system of claim 1, wherein the information related to one or more location-specific features includes information related to one or more conditions of the road surface and/or information related to lane-usage.

4. The system of claim 1, wherein the information related to one or more location-specific features includes information related to road-closures and/or detours.

5. The system of claim 1, wherein the information related to one or more location-specific features includes information related to local data transmission conditions.

6. The system of claim 1, wherein the information related to one or more location-specific features includes information related to road-side signage.

7. The system of claim 1, wherein the received first discrepancy information further includes additional information related to the first surroundings of the first vehicle, wherein the additional information pertains to current local traffic conditions of current local accident occurrences near the first vehicle.

8. The system of claim 1, wherein the one or more processors included in the remote computing server are further configured to exchange access to at least a part of the modified real-time map for compensation.

9. A method for using data-processing resources carried by a fleet of vehicles as a distributed data center to create and update map data, wherein the fleet includes a first vehicle located near first surroundings and a second vehicle located near second surroundings, the method comprising:

maintaining a real-time map of a geographical area, wherein the real-time map includes information related to one or more location-specific features of the first surroundings and the second surroundings, wherein the one or more location-specific features are not pertaining to current local traffic conditions;

receiving, from a first transceiver carried by the first vehicle, first discrepancy information, wherein the first discrepancy information reflects a first detected discrepancy between the real-time map and the first surroundings of the first vehicle that have been detected based on first output signals generated by a first set of sensors carried by the first vehicle, wherein the first detected discrepancy is based on a first comparison of the real-time map data and the first surroundings of the first vehicle;

receiving, from a second transceiver carried by the second vehicle, second discrepancy information, wherein the second discrepancy information reflects a second detected discrepancy between the real-time map and the second surroundings of the second vehicle that have been detected based on second output signals generated by a second set of sensors carried by the second vehicle, wherein the second detected discrepancy is based on a second comparison of the real-time map data and the second surroundings of the second vehicle;

comparing, through a particular comparison, the first discrepancy information with the second discrepancy information;

determining, based on the particular comparison, that the first detected discrepancy corresponds to the second detected discrepancy;

determining that a threshold number of more than one different vehicles has detected the same discrepancy, wherein the threshold number of more than one different vehicles includes the first vehicle and the second vehicle;

responsive to the threshold number of more than one different vehicles having detected the same discrepancy, modifying the real-time map, wherein a modification is based on one or both of the received first discrepancy information and the received second discrepancy information;

transmitting at least a first part of the modified real-time map to the first transceiver of the first vehicle; and transmitting at least a second part of the modified real-time map to the second transceiver of the second vehicle.

10. The method of claim 9, wherein the information related to one or more location-specific features includes information related to road-side construction and/or information related to road-side hazards.

11. The method of claim 9, the information related to one or more location-specific features includes information related to one or more conditions of the road surface and/or information related to lane-usage.

12. The method of claim 9, wherein the information related to one or more location-specific features includes information related to road-closures and/or detours.

13. The method of claim 9, wherein the information related to one or more location-specific features includes information related to road-side signage.

14. The method of claim 9, wherein the received first discrepancy information further includes additional information related to the surroundings of the first vehicle, wherein the additional information pertains to current local traffic conditions of current local accident occurrences near the first vehicle.

* * * * *